Dec. 30, 1958 W. I. GLADFELTER ET AL 2,866,547
ABRASIVE SEPARATOR
Filed Sept. 11, 1956
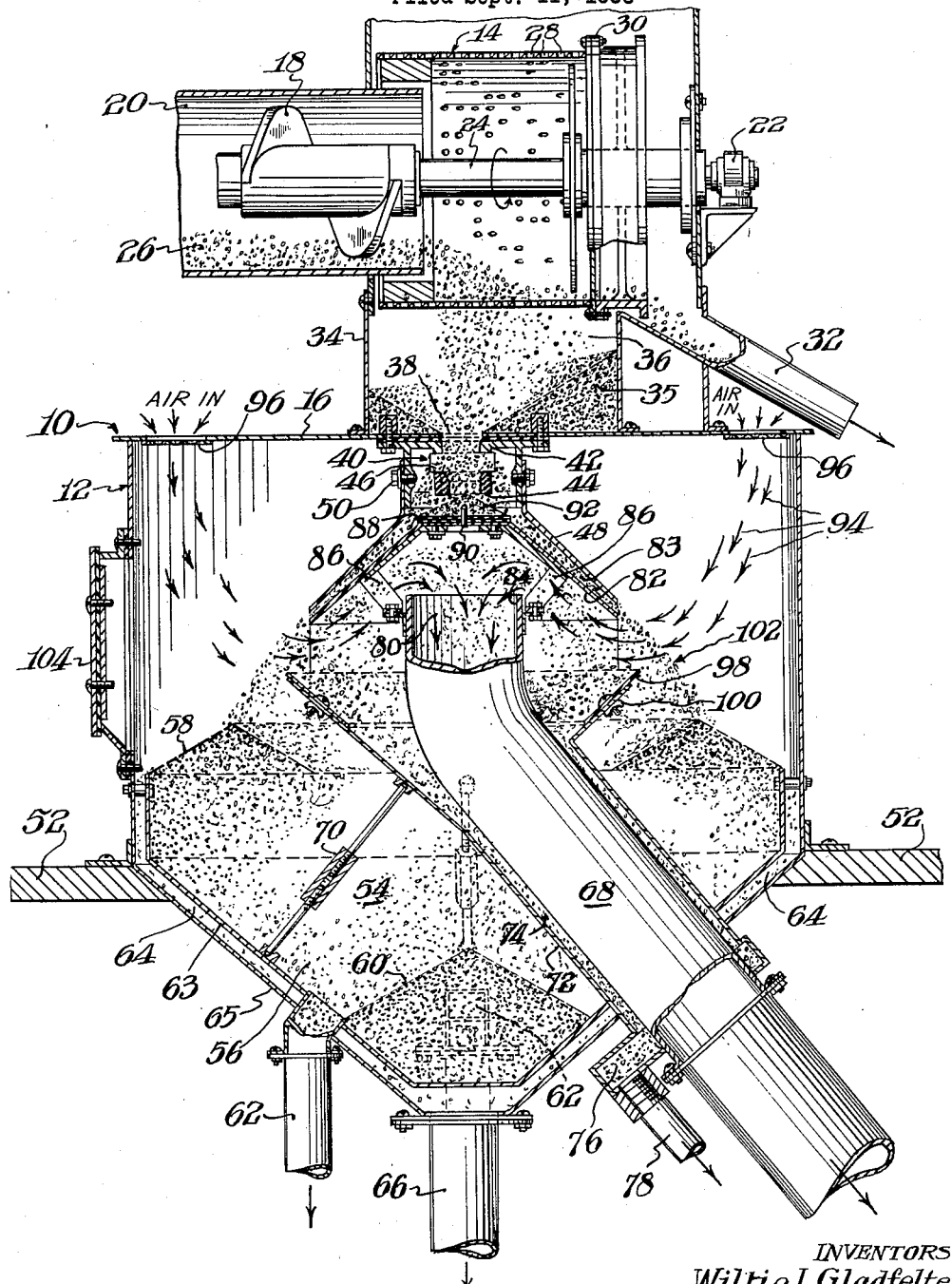
INVENTORS:
Wiltie I. Gladfelter
& Max E. Fahrney
BY
Connolly and Hutz
ATTORNEYS 2,866,547

ABRASIVE SEPARATOR

Wiltie I. Gladfelter and Max E. Fahrney, Hagerstown, Md., assignors to Pangborn Corporation, a corporation of Maryland Application September 11, 1956, Serial No. 609,265

7 Claims. (Cl. 209—33)

This invention relates to an apparatus for classifying and sorting granular solids, and more particularly to an apparatus for separating reusable abrasive particles from a mixture of granular solids including these abrasive particles.

Granular particles of abrasive are used in blast cleaning forgings, castings, or other similar articles. These abrasive particles are propelled at a high velocity at castings, for example, to remove foundry sand, gating marks and appurtenances which may become attached to the casting in the molding operation.

Typical particles used as abrasive are hard metal, such as steel shot or cracked steel grits, and sharp quartz sand. During the blast cleaning operation, a portion of these abrasive particles may be broken up into fine particles which are of no further use as abrasive, and foreign matter removed from the casting, such as sand, scale, rust and dust is intermixed with the abrasive.

Apparatus has been proposed for separating reusable abrasive particles from non-reusable fine abrasive dust and foreign matter. Some of these separators classify these mixtures by passing them across an air stream. In a separator which employs an air stream for separating reusable abrasive from a mixture of granular solids, it is important to provide a structure which is readily adjustable to optimum operating conditions, has a high flow capacity relative to space occupied, is not subject to obstructions of flow, and is economical to fabricate.

In accordance with this invention, an apparatus for separating reusable abrasive particles from a mixture of granular solids includes an exhaust pipe, for carrying away finest particles, which is shielded by a conical stratifying cone which it supports over its inlet. The mixture of granular solids drops and spreads over this conical stratifying cone to fall freely across the air stream entering the inlet to the exhaust pipe and passing under the depending edge of the conical stratifying cone. The finest particles of the mixture are carried with the air stream into the exhaust pipe, and the heaviest particles fall into a collecting bin supported below the exhaust pipe inlet from the separator casing. These heaviest particles are circulated back to the blast cleaning equipment wherein they are reused as abrasive. The air stream including the entrained fine particles of broken abrasive and foreign matter is channeled to a collector which collects and disposes of these fine particles or dust as refuse.

An inverted conical member surrounds and is attached to the exhaust pipe in a position slightly below the depending edge of the shielding conical stratifying cone. Attached to the inside of the inverted conical member are adjustable skimmer plates. These plates are adjustable on the slope of the inverted member. Particles of an intermediate size are collected by these skimmer plates and channeled in a conduit, which annularly surrounds the exhaust pipe, to be collected and discarded. The collecting bin for the reusable abrasive may include spaced inner and outer bin walls providing therebetween an overflow space carrying away excessive abrasive to prevent a build up of abrasive to the height of the edge of the skimmer plate. This overflow space is channeled directly back to the blasting equipment. Reusable abrasive is therefore both stored and rechanneled to the blasting equipment from the storage and collecting bin and directly rechanneled from this overflow space.

This structure is readily adjustable and not subject to obstruction by virtue of its novel configuration and means of support. The collecting bins for reusable abrasive are directly supported from the outer casing. The exhaust pipe and annularly surrounding inverted cone with skimmer plates and channel are supported by adjustable rods mounted within the collecting bin. The conical stratifying cone shielding the inlet to the exhaust pipe is mounted upon the inlet end of the exhaust pipe. The exhaust pipe may be inclined away from a vertical inlet portion to pass through the sidewalls of the collecting hoppers, at a point which preserves the lower outlet portions of the collecting bins unobstructed.

A novel self-contained separating structure may include a scalping device mounted upon the top of the casing in a position to drop a roughly screened mixture of granular solids onto the conical stratifying cone covering the exhaust pipe inlet. A novel feed control and directing means or spout may be provided for directing the mixture upon the top of this stratifying cone. This spout is supported from the upper portion of the casing and may include a shroud which overlies the conical stratifying cone, eliminating abrasive bouncing and preventing any air turbulence from disturbing flow of abrasive on the conical stratifying cone. The space between the shroud and stratifying cone may advantageously taper at its outlet to provide a thin and even flow of the mixture across the air stream. This air stream is admitted through inlets in the upper portion of the casing and passes between the depending edges of the shroud and stratifying cone and the upwardly extending edge of the skimmer plates to rise under the stratifying cone and enter the exhaust pipe inlet. This shroud is advantageously mounted to be adjustable in a vertical direction, and the stratifying cone and entire exhaust pipe assembly are also respectively vertically and universally adjustable. The skimmer plates are also vertically adjustable up or down on the inverted cone.

An efficient separator structure may also include a novel feed control and stratifying cone arrangement. The stratifying cone may be made in the form of a truncated cone which accumulates a substantially conical pile of the granular mixture upon its flat top. A spout which cooperates to maintain this substantially conical pile of granular particles includes inlet and outlet sections separated by an overflow space. The outlet has a capacity smaller than the inlet to assure the initial direction of particle flow to the center of the stratifying cone. This insures that sufficient particles under all conditions of flow are directed to the center of the stratifying cone where they form the aforementioned substantially conical pile. At normal flow, a portion of particles fall through the overflow upon the lower slope of this conical pile and accordingly are directed down the sloping sides of the stratifying cone. The flat top of the truncated conical stratifying cone may consist of a flat plate which is adjustable in a vertical direction to provide optimum conditions of flow.

Novel features and advantages of the present invention will become apparent to one skilled in the art from a reading of the following description in conjunction with the accompanying single figure of drawing which is a schematic diagram partially in cross section and partially broken away to show an embodiment of this invention.

In this single figure, an apparatus generally designated 10 for separating reusable abrasive from a mixture of granular solids comprises a casing 12 within which a scalping device 14 is mounted upon horizontal plate 16 which forms a roof for the casing 12.

Scalping device 14 includes a screw conveyor 18 horizontally mounted within a supply conduit or pipe 20. This screw conveyor is mounted on a rotatable shaft 24, driven by ordinary means, not shown, and is mounted in a bearing 22. The screw conveyor is used to propel a mixture of granular solids 26 which has been collected, for example, from a blast cleaning apparatus (not shown). Scalping device 14 includes a perforated drum 28 which is rotated by connection of its end flange 30 to aforementioned shafting 24. Outlet conduit or spout 32 channels particles too large to pass through perforated drum 28, which accordingly pass longitudinally through the drum and flange 30, away from casing 12 and discharges them as coarse refuse. This coarse refuse may include nails, wires, and other foreign matter which must be screened from the mixture before it is subjected to an air stream separation. A scalping device of this general type is fully described in U. S. Letters Patent 2,247,385.

Scalping device 14 is mounted upon the roof 16 of casing 12 by walls 34 of an intermediate feed chamber 36. An aperture 38 is provided through roof 16 and the bottom of feed chamber 36 for providing a flow of granular solids 35 to the separating apparatus within casing 12. Feed control device or spout 40 is suspended from roof 16.

Feed control device or spout 40 includes inlet section 42 and outlet section 44 separated by an overflow space 46. Outlet section 44 is of lesser cross-sectional area than inlet section 42 to assure a primarily centrally directed stream of particles for a purpose later described in detail. When outlet section 44 is full of particles, any excess particles flow through overflow space 46 in an annular stream surrounding outlet section 44.

Shroud 48 is suspended from feed control means 40 by a vertically adjustable bolt and slot arrangement 50. Shroud 48 cooperates with remaining portions of the separator in a manner later described in detail.

Casing 12 is supported, for example, from horizontal structural plate 52. The lower portion of the casing is made in the form of a substantially inverted conical collecting bin 54 for collecting and storing reusable abrasive particles 56, which are indicated therein at high level angle of repose 58 and the low level angle of repose 60. Outlet conduits 62 channel the abrasive from lower portions of bin 54 to the blast cleaning equipment.

Wall 63 of bin 54 is spaced from lower outer casing wall 65 to provide an overflow channel or space 64 for carrying away abrasive particles after they have piled up to the height of the high level angle of repose 58. Conduit 66 at the bottom center of casing 12 channels the abrasive particles from overflow channel 64 back to the blasting cleaning equipment. The height of abrasive particles within hopper 54 accordingly is prevented from rising to a height which interferes with free flow of the air stream which is described in detail in the following.

An exhaust pipe 68 is adjustably supported within bin 54 by means of adjustable tie rods 70 which are anchored in inner wall 63. Exhaust pipe 68 is surrounded by a conduit 72 providing an annular space 74 for channeling particles of an intermediate size from the separator. Annular space 74 communicates with an annular chamber 76 outside of casing 12 from which these particles of intermediate size, which may be called fine refuse, are channeled by a conduit or pipe 78. Conduit 72 is directly supported from adjustable tie rods 70. Exhaust pipe 68 is secured within conduit 72 at collecting chamber 76 and by other means at their uppermost portions (not shown). Exhaust pipe 68 is accordingly indirectly supported by adjustable tie rods 70.

Exhaust pipe 68 extends through the inner and outer shells 63 and 65 enclosing storage bin 54 and rises to a point directly under granular material feeding spout 40. Entrance end 80 of exhaust pipe 68 is curved to provide a vertically rising entrance section directly below feeding spout 40. A truncated conical stratifying cone 82 is supported above the entrance aperture 84 of exhaust pipe 68 by brackets 86. There are several circular plates 88 mounted on cone 82 by means of holes in the plates being centered over pin 90. The gap between outlet section 44 and the conical pile of abrasive 92 is adjustable only by means of adding or removing plates for proper height. A substantially conical pile of abrasive 92 is thereby maintained on the flat top of plate 82 at a distance most conducive to promote efficient distribution of granular solids. Shroud 48 approaches or tapers toward conical stratifying cone 82 from inlet toward outlet. This provides a gradually narrowing passageway for particles of the mixture as they pass between the shroud and conical stratifying cone. This provides a thinning and fanning out of the mixture to be subjected to the air stream.

This air stream, designated by arrows 94, enters the casing through screened inlets 96 about the periphery of casing roof 16 and is attracted to the inlet of the exhaust pipe which draws it downward below the depending edges of shroud 48 and conical stratifying cone 82, whereupon it passes under conical stratifying cone 82 and then down into the entrance 84 of exhaust pipe 68. An air stream flow of 1500 to 2000 C. F. M., for example, may be utilized to advantage.

Conduit 72 terminates a short distance below the entrance section 80 of exhaust pipe 68 in an expanded inverted conical stratifying cone 100 to the inside of which are attached adjustable skimmer plates 98. These skimmer plates are adjustable on the slope of the cone 100. The air stream 94 flows through the space between the depending edge of conical stratifying cone 82 and the upper edge of the skimmer plates 98. Those particles in the air stream which are of an intermediate size are collected by the skimmer plates and channeled into conduit 74 annularly surrounding the exhaust pipe. They pass through this conduit to a collection point, not shown, where they are collected and discarded. The adjustment of the skimmer plates 98 which are adjustable either in or out on the internal surface of the cone, permits variation of the size of particles accumulated within the skimmer plate 98 from the air stream 94 passing through the thin stream 102 of abrasive particles dropping off the edge of conical stratifying cone or distributing member 82. Access doors 104 (only one shown) are provided at convenient intervals around casing 12 to provide convenient access for adjusting, cleaning, and maintaining this novel structure.

This structure operates in the following manner to separate reusable abrasive particles 56 in bin 54 from a mixture of granular particles or solids including unusable fine bits of abrasive and foreign matter.

Mixture of granular particles 26 is fed through conduit 20 by screw conveyor 18 into perforated cylinder 28 of scalping device 14. Particles 35 of abrasive and small particles of foreign matter enter feed bin 36 through the perforations in rotating drum 28. Larger particles of foreign matter pass laterally through the rotating drum 28 and are carried away through refuse spout or channel 32. An auxiliary particle screening device (not shown) may be connected to spout 32 to screen out and deliver any usable abrasive back to the system.

Granular mixture 35 in feed bin 36 flows through the orifice 38 in casing roof 16 to enter the feeding device 40. Outlet section 44 of feeding device 40 delivers a supply of granular mixture directly on the center of the upper plate 88 to provide a substantially conical pile 92. Excess particles pour through overflow space 46 around outlet section 44 to flow down the sides of conical pile 92 and the slopping sides of stratifying cone 82. Shroud 48 is adjusted from its suspension on feed control device 40 to provide a space 83 between shroud 48 and stratifying cone 82, which narrows or thins from entrance to exit. The granular particles are smoothly spread out and thinner to fall in stream 102 across air stream 94 flowing under the depending edge of stratifying cone 82 and entering entrance 84 of exhaust pipe 68.

As air stream 94 passes through the falling stream 102 of granular particles, it carries inwardly with it finest and lightest particles such as sand, scale, and very fine abrasive. When this particle-ladened air stream passes the upper lip of skimmer plates 98, the finest particles are carried through exhaust pipe 68 into a dust collector (not shown). Slightly heavier or coarser particles, which may be referred to as particles of intermediate size, fall from the air stream into the collector formed by skimmer plates 98; and they then flow through annular conduit 74, collecting chamber 76 and pipe 78 into a receptacle for fine or intermediate refuse.

The heaviest and coarsest particles, which are relatively unaffected by the air stream, fall past the upper edge of skimmer plate 98 into storage bin 54 where they are stored until drawn off through outlets 62 which carry the reusable abrasive particles back to the blasting equipment (not shown). Vertical adjustment of the position of the skimmer plates 98 controls the size of the particles 56 reclaimed in storage bin 54.

Overflow space 64 provided between inner wall 63 and lower casing wall 65 carries abrasive particles which build up to a level above the high level angle of repose 58 to conduit 66 where they are recirculated to the blasting equipment. This overflow space 64 prevents reclaimed abrasive from building up in storage bin 54 to a height interfering with the flow of air stream 94 between stratifying cone 82 and skimmer plate 98.

Flow passages for granular particles and air are accordingly provided through this novel structure of a direct and unobstructed nature. The various supporting members are easily accessible for adjustment and provide minimum interference with the flow of air and particles through the separator. A simplicity of arrangement and construction is also provided which facilitates economical fabrication of this device. Highly efficient particle distribution is provided by means of the novel stratifying cone 82 topped by the conical pile 92 of granular particles which cooperates in evenly and smoothly distributing the granular particles around the periphery of the sloping distributing stratifying cone 82. The resistance of this pile of particles to particles of a similar nature which drop upon it, for some unexplained reason, provides a superior flow distribution which unexpectedly improves flow characteristics of these particles across the air stream and hence unexpectedly improves efficiency of separation. Novel feed control device 40 cooperates with this novel distributing device to maintain this pile of abrasive properly formed on top of stratifying cone 82.

Obviously many modifications and variations of the present invention are possible in the light of the above teachings. It is, therefore, to be understood that within the scope of the appended claims the invention may be practiced otherwise than as specifically described.

What is claimed is:

1. An apparatus for separating reusable abrasive from a mixture of granular solids by means of an air flow comprising a separator having an exhaust pipe for collecting non-reusable abrasive particles from entrainment in an air stream, said exhaust pipe being positioned centrally of said separator and having an inlet at its upper end, inner and outer collecting bins coaxial with each other and with said exhaust pipe, the inner bin providing means for storing a quantity of reusable abrasive and the outer bin being spaced from said inner bin to provide an overflow channel for carrying away excess reusable abrasive above the upper edge of the inner bin to prevent a build-up of abrasive and consequent interference with air flow into said exhaust pipe, a truncated cone disposed above the inlet of said exhaust pipe, and an inverted conical skimmer element surrounding said exhaust pipe at a position below the depending edge of said truncated cone for collecting particles of a size intermediate finest particles collected by said exhaust pipe and heaviest particles collected by said bins.

2. An apparatus for separating reusable abrasive from a mixture of granular solids comprising an outside casing, an inlet for granular particles, an open-mouthed exhaust pipe for carrying away finest particles, air flow means providing a stream of air flowing into the mouth of said exhaust pipe, a truncated conical member supported in vertically-spaced relation to said inlet and to the mouth of said exhaust pipe so that it shields the mouth of the exhaust pipe from direct entry by said solids and allows said solids to fall freely across said air stream entering said exhaust pipe after passing under the depending edge of said conical member, a collecting bin supported from said casing for collecting heaviest particles to be re-used as abrasive, a feeding hopper supported from said casing in operative relation to said inlet for supplying granular particles to said conical member, an adjustable means for supporting said exhaust pipe at a selectable distance from said feeding hopper, an inverted conical skimmer element and conduit secured to and surrounding said exhaust pipe at a position below the depending edge of said truncated conical member for collecting particles of an intermediate size, and said inverted conical skimmer element and conduit being directly supported by said adjustable means.

3. A separator as set forth in claim 1 wherein a shroud overlies said truncated cone, and the space between said shroud and said cone narrows toward the lower peripheral edge of said cone.

4. An abrasive separator as set forth in claim 2 wherein said collecting bin comprises spaced inner and outer chambers providing therebetween an overflow channel for carrying away excess abrasive to prevent a substantial build-up of abrasive above the height of the bin, and wherein said conical skimmer element is vertically adjustable to vary the size of particles collected thereby from said air stream.

5. A separator as set forth in claim 4 wherein said inner and outer chambers are substantially inverted cones in shape, and said exhaust pipe is inclined from the vertical to pass through the sidewalls of said bins.

6. A separator as set forth in claim 5 wherein a scalping device is mounted upon said casing in a position to drop said mixture upon said conical member, and a guiding means including a spout and a shroud are positioned intermediate said scalping device and said conical member with said shroud overlying said conical member.

7. A separator as set forth in claim 6 wherein said conical member comprises a truncated cone and said spout includes outlet and inlet sections separated by an overflow space, said outlet section being of lesser capacity than said inlet section to maintain a substantially conical pile of solids on the top of said truncated cone, and the space between said shroud and said cone narrowing towards its outlet to discharge said solids in a thin layer across said air stream.

References Cited in the file of this patent

UNITED STATES PATENTS

| 82,431 | Mills | Sept. 22, 1868 |
| 525,048 | Holt | Aug. 28, 1894 |
| 584,647 | Pape | June 15, 1897 |
| 2,132,961 | Morgan | Oct. 11, 1938 |
| 2,649,962 | Ruemelin | Aug. 25, 1953 |

UNITED STATES PATENT OFFICE
CERTIFICATE OF CORRECTION

Patent No. 2,866,547                                             December 30, 1958

Wiltie I. Gladfelter et al.

It is hereby certified that error appears in the printed specification of the above numbered patent requiring correction and that the said Letters Patent should read as corrected below.

Column 4, line 74, for "slopping" read -- sloping --; column 5, line 4, for "thinner" read -- thinned --; column 6, line 3, after "abrasive" insert -- above the upper edge of the inner bin --.

Signed and sealed this 16th day of June 1959.

(SEAL)
Attest:

KARL H. AXLINE                                                 ROBERT C. WATSON
Attesting Officer                                          Commissioner of Patents